United States Patent
Bliss

[11] 3,744,299
[45] July 10, 1973

[54] CRACK DETECTOR
[75] Inventor: George N. Bliss, Franklin, Mich.
[73] Assignee: Diamond International Corporation, New York, N.Y.
[22] Filed: Oct. 28, 1970
[21] Appl. No.: 84,657

[52] U.S. Cl............... 73/67.1, 73/12, 73/67.2
[51] Int. Cl. .................................. G01m 7/00
[58] Field of Search................ 73/67, 67.1, 67.2, 73/67.5, 67.6, 67.8, 69, 12

[56] References Cited
UNITED STATES PATENTS

| | | | |
|---|---|---|---|
| 2,403,999 | 7/1946 | Read et al............................ | 73/67.2 |
| 2,412,240 | 12/1946 | Williams et al....................... | 73/67 |
| 2,971,372 | 2/1961 | Lewis et al. ......................... | 73/67.5 S |
| 3,067,605 | 12/1962 | Bliss...................................... | 73/12 |
| 3,097,523 | 7/1963 | Diamond et al. ...................... | 73/69 |
| 3,550,434 | 12/1970 | Schroeer et al....................... | 73/67.2 |

FOREIGN PATENTS OR APPLICATIONS
1,056,088  1/1967  Great Britain...................... 73/67.1

Primary Examiner—Richard C. Queisser
Assistant Examiner—John P. Beauchamp
Attorney—Karl W. Flocks

[57] ABSTRACT

Distinguishing a cracked article from a sound article by tapping the article with a vibration transducer means and detecting and measuring either the width of a pulse, the length of a pulse train, or the curve of a voltage input to the article against the curve of the voltage output from the article. The vibration transducer means in one embodiment is vibration sensitive elements such as piezoelectric crystals placed in a row to receive the article under test being rolled over it, connected to amplifying and discriminating means which may be followed by recording means for later removal of cracked objects.

13 Claims, 18 Drawing Figures 3,744,299

GEORGE N. BLISS

BY Karl W. Flocks
ATTORNEY

INVENTOR
GEORGE N. BLISS
BY KARL W FLOCKS
ATTORNEY

CRACK DETECTOR

BACKGROUND OF THE INVENTION

The present invention relates to the examination of articles to detect cracks therein and particularly to the inspection of eggs to detect cracked egg shells.

With the advent of high speed sorting and packaging machinery in the egg industry along with the soaring costs of labor and the increasingly stricter laws regarding the sale of cracked eggs for human consumption, the need for a sorting device for cracked eggs becomes more urgent. Eggs are currently passed over banks of strong lights, cracked eggs being sorted out visually. However, due to operator fatigue and inability to distinguish fresh cracks, many cracked eggs get through to the market causing woe for the stores and for the housewife.

Crack detectors have also been operated on the principle of the ability of a sound egg shell to return energy to an object which strikes or taps it. In U.S. Pat. No. 3,067,605 of the present invention, entitled "Cracked Egg Detector" and issued Dec. 11, 1962 an egg was struck with a lightweight hammer with a sound shell producing a substantial rebound and a cracked shell producing little or no rebound.

An extension of such cracked egg detection takes place when a sound eggshell is tapped with a vibration sensitive device such as a piezoelectric crystal, a sharp electrical pulse of short duration being produced, since a sound eggshell is an efficient elastic surface capable of returning most of the energy imparted to it. If an egg is cracked, however, the elasticity of the adjacent shell area is seriously impaired. An egg tapped in this area produces a dull pulse, that is, one of lower magnitude but greater width.

It would seem, therefore, that rolling an egg over a series of crystals and observing the magnitude of the pulses could provide an accurate basis for the determination of cracks; one or more pulses falling below an established minimum announcing the presence of a crack. This method, however, is beset with difficulties. First, the height of the pulse is determined not only by the soundness of the shell but by the speed of the impact. It is extremely difficult to roll an egg over a series of crystals and have it hit each crystal with exactly the same force. There is always a tendency for the egg to hop over some and hit others with more force. The height of the pulses is also sensitive to the speed at which the machine is operated. Variations in shell thickness also cause variations in pulse height. Even if these difficulties could be overcome, there would remain the problem of counting the proper number of pulses as the egg runs by, a cracked egg producing fewer than the required number of high pulses.

SUMMARY OF THE INVENTION

In the present invention the egg is either lightly tapped by, or rolled over, a vibration sensitive element such as a piezoelectric crystal and the shell's ability to return energy to the crystal may be determined in one of several ways.

In the present invention a crack in an article may be detected by contacting an article on its surface with at least one vibration transducer thus imparting energy to the article at its point of contact and detecting and measuring the energy returned from the article in comparison to the energy imparted to the article.

Also in the present invention the width of the pulse may be utilized while the height of the pulse is ignored. Since the width of the pulse produced by a cracked egg is of a greater magnitude than that produced by a sound egg, the need for costly and complex counting circuits is eliminated. One or more excessively wide pulses are all that is required to determine the presence of a crack.

An object of the present invention is to provide impact transducer means by which the soundness of an object can be determined by the nature and shape of the output signal.

Another object of the present invention is to provide a series of said impact transducers over which an object may be rolled, presenting different portions of its surface to successive elements.

Still another object of the present invention is to utilize the outputs of said impact transducers in scch a manner as to not reject a sound article which is mishandled or might bounce over one or more said elements, achieving a failsafe read out.

A further object of the present inventon is to provide a device for the removal of cracked eggs from a rapidly moving stream of eggs with said device unaffected by the contents of broken eggs which might be spilled upon it and which is easy to clean and maintain, requiring infrequent, if any, adjustment.

The objects, nature and advantages of the instant invention will be more apparent from th following more detiled description of the invention taken in conjunction with the drawings, wherein:

BRIEF DESCRIPTION OF THE DRAWINGS

FIGS. 3A through 7E are waveforms showing comparison of circuit outputs caused by sound and cracked eggs.

DESCRIPTION OF THE PREFERRED EMBODIMENTS

Figure 1:
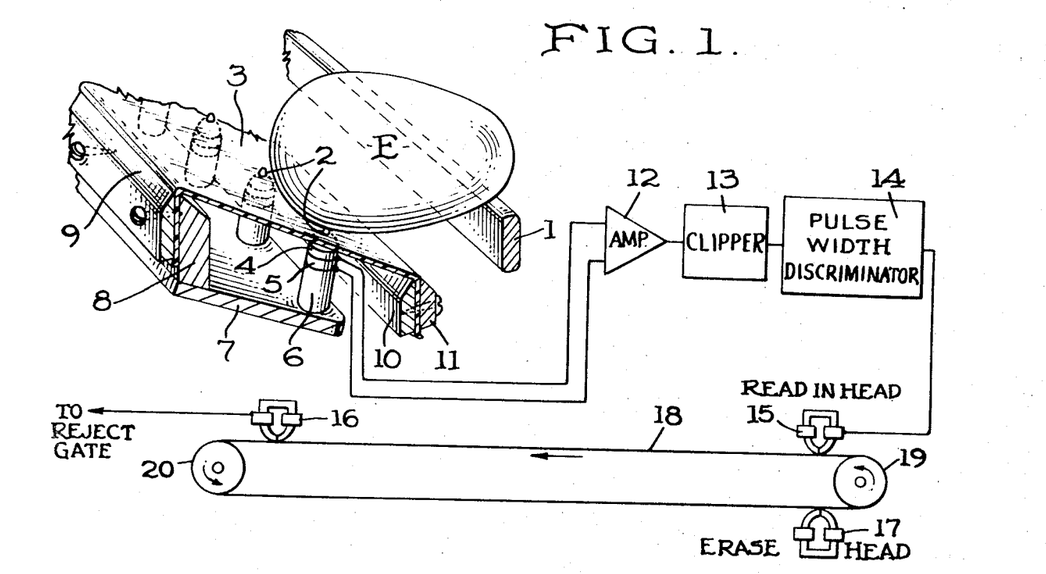
FIG. 1 is a diagrammatic view of an embodiment of the overall device of the present invention.

Referring now to FIG. 1, egg E, is rolled over rail 1, which supports one side of the egg and a series of half round buttons 2, which supports the other side of the egg. The buttons 2, which may be small round head rivets, are inserted through holes in plastic sheet 3, into discs 4. Cemented or soldered to discs 4, are piezoelectric crystals 5, with mass elements 6, cemented or soldered to the other side. Plastic sheet 3, which is stretched between two sets of clamping plates 8, 9, 10 and 11 serves several functions. It provides good alignment and even spacing of the buttons 2, it transmits little vibration from one crystal to its neighbors and it protects the crystal elements underneath from any egg liquids which may be spilled upon it. Strips of vibration damping material 7, may be included to minimize ringing of the crystals.

The electric signals produced by crystals 5, are amplified by amplifier 12, the amplified signals being clipped by clipper 13, thus eliminating pulse height as a variable. The clipped pulses are then fed to pulse width discriminator 14, which passes only pulses exceeding a predetermined width. These pulses may be used in many ways known to those skilled in the art as a basis for elimination of cracked eggs. For the purpose of illustration, pulses are fed into read-in head 15, and recorded on magnetic tape 18, which travels in an endless loop around sprockets 19 and 20, as the cracked egg reaches the deflection gate downstream, the signal on magnetic tape 18, is read out by head 16, to operate the gate. The read-out head 16 is spaced from read-in head 15 a predetermined distance in relation to the timed movement of tape 18 to coincide the reading at read-out head 16 with the arrival of the egg at the gate.

With the recent rapid advances of integrated circuit technology and the availability of complete operational amplifiers within a single chip, these devices are destined to find their way into many electronic devices. The low price and uniformity of the modern operational amplifier make it ideally suited for use in a crack detector.

Figure 2:
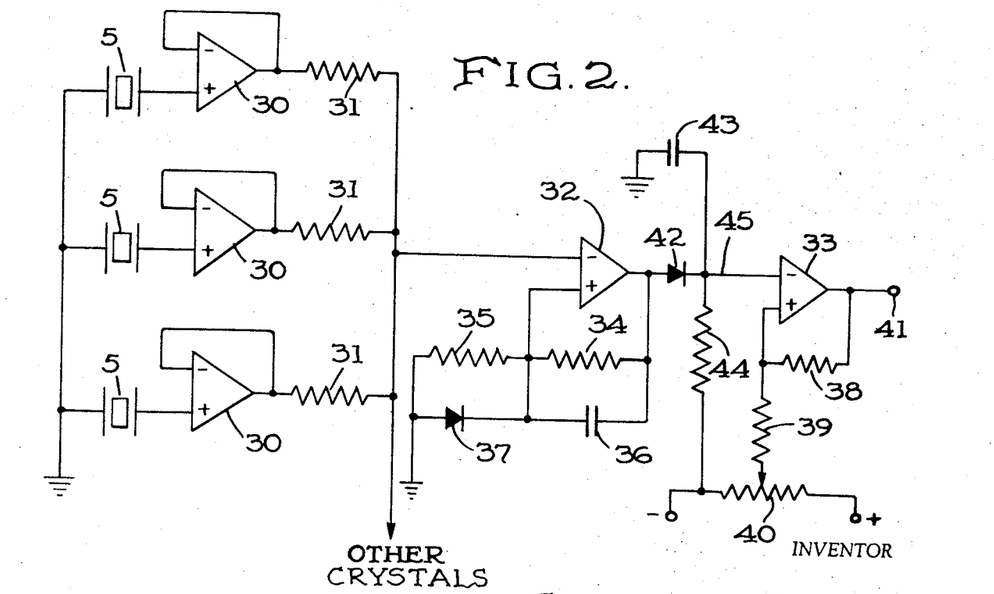
FIG. 2 is a circuit diagram of the electronic components shown in block form in FIG. 1.

Referring now to FIG. 2, signals from a series of crystals 5, are fed into individual operational amplifier 30, connected in voltage follower configuration, that is, with feedback directly coupled to the minus input. In this configuration the devices have an input impedance on the order of many megohms while achieving an output impedance of only a few ohms.

Figure 3A:
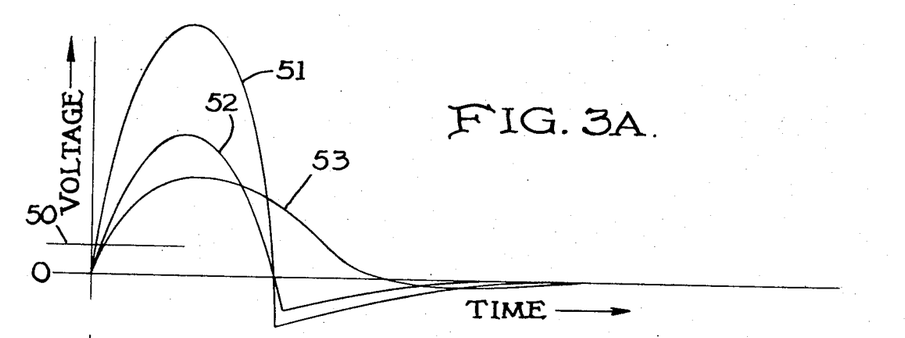

The multiple amplifiers 30, are fed through isolating resistors 31 to the negative input of operational amplifier 32, the positive feedback loop comprising resistors 34 or 35, causing it to function as a Schmidt trigger whose function may be understood by referring to FIG. 3A.

In FIG. 3A curves 51 and 52 show the voltage produced by tapping a sound shell with varying force. Although the voltage varies with force both curves cross the zero axis at the same time. Curve 53, however, results when a fractured shell is tapped, the voltage crossing the zero axis later in time. Immediately upon tapping any shell when voltage exceeds line 50, the Schmidt trigger 32, turns on, its output showing at curve 59, FIG. 3B. Schmidt trigger 32 remains in the turned on condition until the input voltage falls below the zero axis. Thus input curves 51 or 52 would produce output curve 54 while input curve 53 would produce output curve 55. The output pulse produced by a cracked shell is of longer duration and encloses a larger area under curve 55.

Figure 3B:
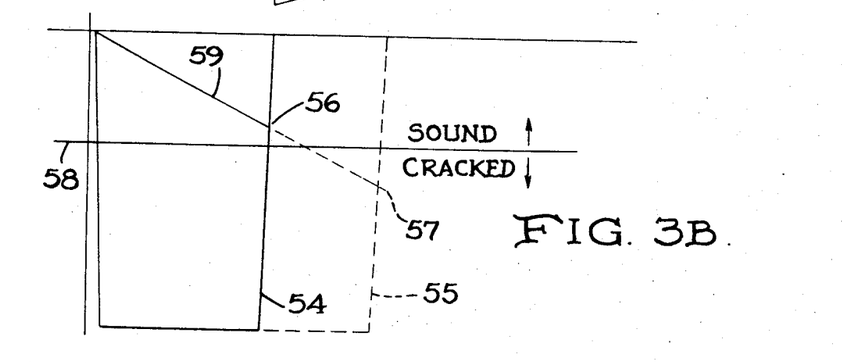

The area within the output pulse of operational amplifier 32 is fed to diode 42 and measured on an integrating circuit comprising condenser 43 and resistor 44. When operational amplifier 32 turns on, the anode of diode 42 goes negative allowing point 45 to go negative at a speed determined by the time constant of condenser 43 and resistor 44. When the operational amplifier turns off, condenser 43 discharges through diode 42 and the voltage at point 45 is returned to the original state. In FIG. 3B, line 59 represents the charging rate of capacitor 43 with discharge times at point 56, or 57, depending on whether the shell is cracked or sound.

Figure 3C:
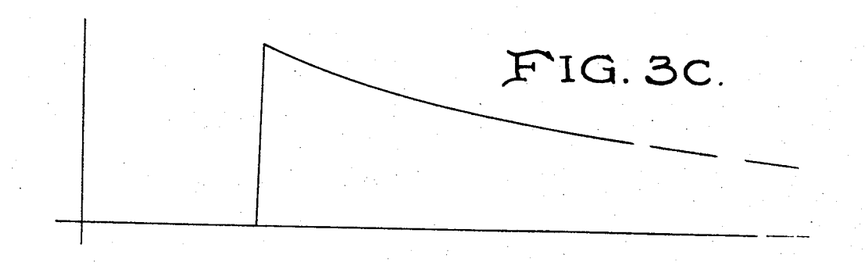

The integrator output at point 45, is then fed into the minus input of operational amplifier 33, which is connected as a voltage comparator. The voltage comparator circuit is similar to a Schmidt trigger, the plus input being connected to a voltage reference source 40. Whenever the input voltage 45 falls below the reference voltage, the unit turns on. In FIG. 3B, line 58 is the reference voltage, chosen so that point 56 lies above and point 57 lies below it. Thus cracked eggs produce a pulse, FIG. 3C, at point 41, while sound eggs have no effect upon it.

Figure 4A:
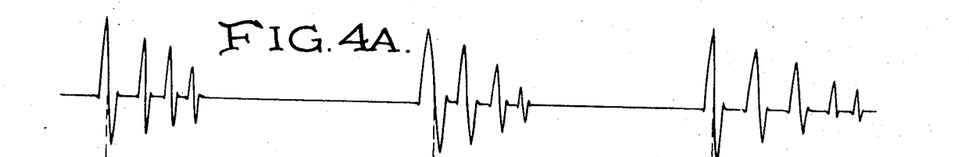
Figure 4B:
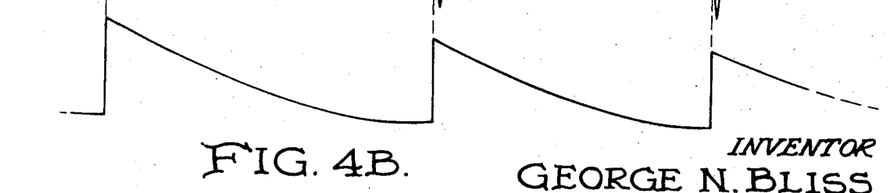

Although not necessary with good damping, a further refinement is usually desirable. An egg rolling at high speed over a series of buttons tends to produce a series of pulse trains rather than a series of individual single pulses. To prevent false read outs it is desirable to read only the first pulse of each train. Referring to FIGS. 2 and 3B, when operational amplifier 32 turns on, the output goes sharply negative as shown by curve 54, FIG. 3B, and condenser 36 is discharged through diode 37. When the unit turns off however, condenser 36 must now bleed off through resistor 35, raising the voltage at the plus input to a greater value than the succeeding pulses in the train coming into the minus input, rendering operational amplifier 32 unresponsive to these pulses. FIG. 4A, depicts a typical series of pulse trains. FIG. 4B, representing the voltage at the positive input of operational amplifier 32, the time constant of condenser 36, and resistor 35, being such as to make operational amplifier 32 ready to respond to the first pulse of the next train.

It should be understood to those skilled in the art that there are many possible configurations of crystals and crystal holders, nor need the egg be necessarily rolled over the crystals. It need only contact the crystal in any convenient manner. The egg might be revolved and contacted repeatedly on various points of its shell by the same crystal without departing from the scope of the invention.

Figure 5A:
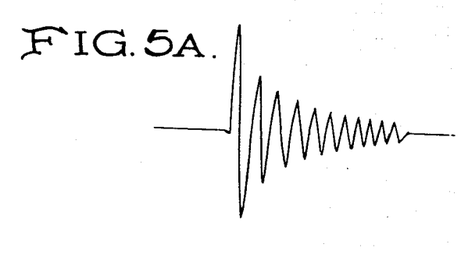
Figure 5B:
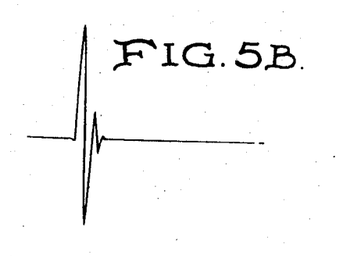

A sound egg shell coming in contact with a crystal element is capable of producing a damped wave train such as that shown in FIG. 5A, the frequency of vibration depending on the thickness of the eggshell and the mass of the crystal element. An eggshell contacted in the vicinity of a crack will produce a more highly damped wave train such as that shown in FIG. 5B, the degree of damping depending upon the size of the crack and the distance from the crack at which the egg is contracted.

Figure 5C:
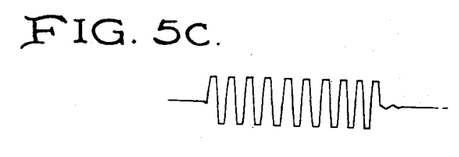
Figure 5D:
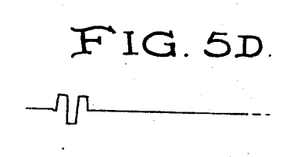

The damping factor may be read in several ways known to those skilled in the art. For example, the signal may be amplified and chopped, producing a string of pulses shown in FIG. 5C for a sound shell or in 5D for a cracked shell. The pulses then may be counted either with a digital device or a staircase generator.

In practice however, it requires a great deal of control to obtain a damped wave train such as FIG. 5A since firm contact must be maintained between shell and crystal. With a rapidly moving stream of eggs rolling over the crystal this becomes difficult, the crystal bouncing numerous times producing an erratic string of pulses such as that shown in FIG. 4A.

Figure 6:
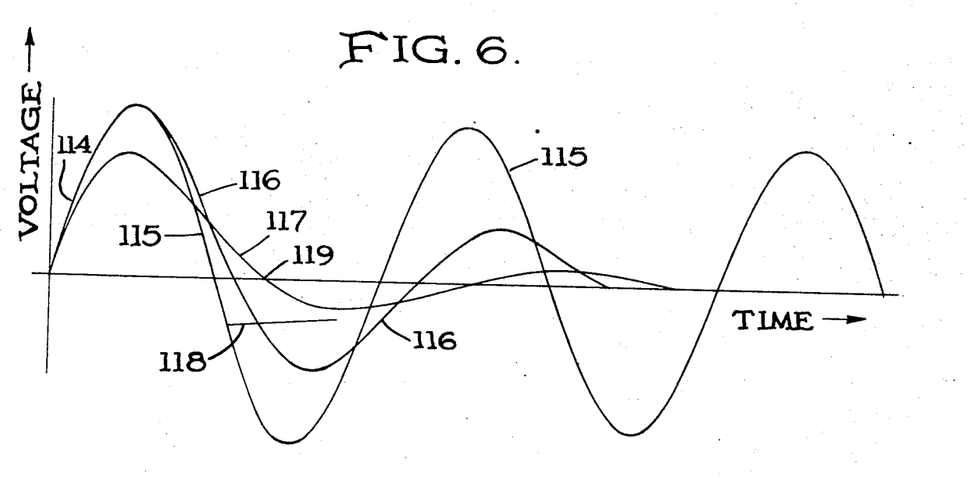

The entire wave train need not be produced however since the information needed to predict its length is contained within the first half cycle. Referring to FIG. 6 various damped wave trains are depicted in detail. Curve 115 is a long wave train produced by tapping a sound shell. The down going slope (approaching the axis) is almost equal to the up going slope 114 (going away from the axis). Curve 116 is produced by striking the same egg, but with a small crack in it, with the same force. Down going slope 116 is now markedly less than up going slope 114, the entire wave train being more damped. If the shell were to be tapped closer to the crack or the crack enlarged, a still more highly damped wave train 117 would be produced. Although up going slope 114 remains practically constant, down going slope 117 has been reduced still further. Since the mass of the crystal has remained constant and the shell (spring) has become weaker, the resonant frequency has been lowered. The displaced crossing of the axis at 119 was the relative basis for crack read out in the previously discussed figures.

Figures 7A, 7B:
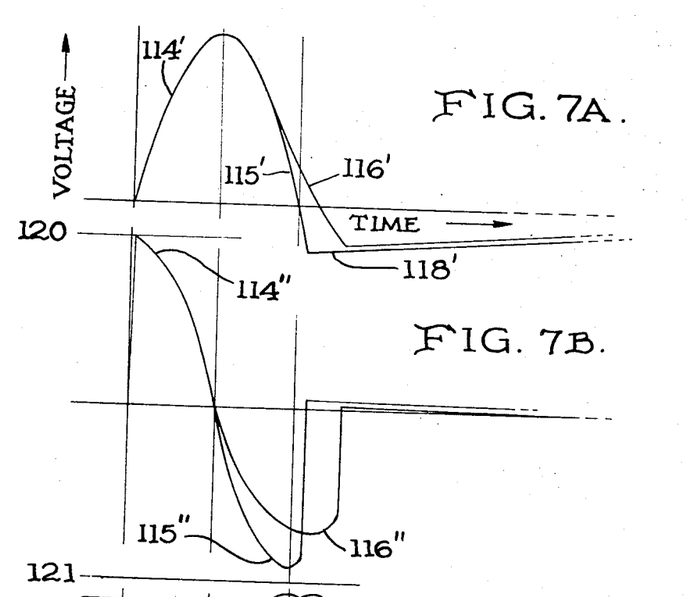

The voltage produced by tapping a sound egg at first rises rapidly as in curve 114, peak out, returns to zero as in line 115, and soon after leaving the axis the crystal loses contact with the shell at line 118. However, we are only concerned with the portion of the curve above the axis. This portion of curves 115 and 116 have been reproduced in FIG. 7A and 115' and 116'. The curves in FIG. 7B are the first derivatives of the curves in FIG. 7A. Since the slope of 115' is almost as great as the slope of 114', curve 115'' peaks out almost as far from the axis near line 121, as curve 114'' at line 120. Since the slope produced by striking a cracked egg is less, curve 116'' peaks out closer to the axis.

Figure 7C:
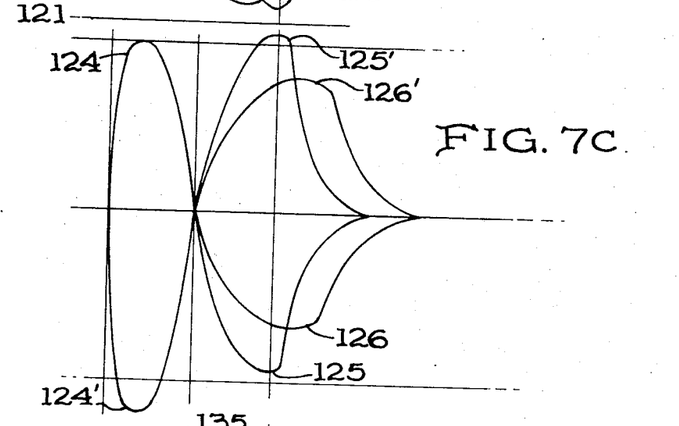
Figure 8:
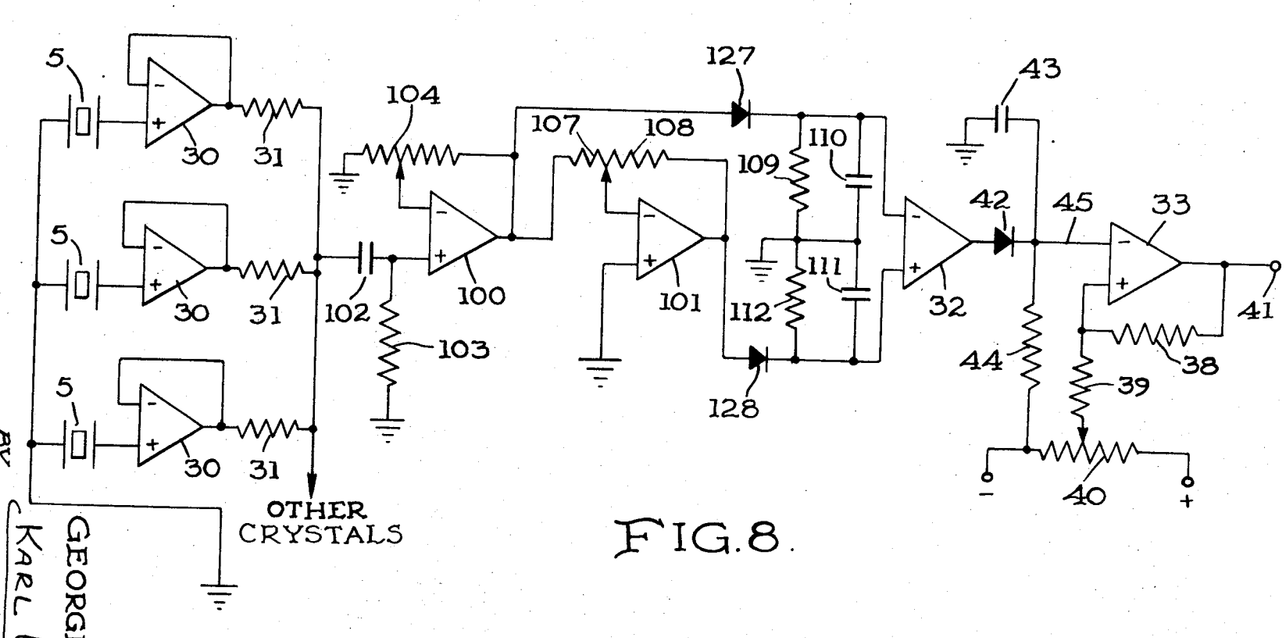
FIG. 8 is another embodiment of the circuit of FIG. 2 for finer discrimination between sound and cracked shells.

Referring now to FIG. 8, the outputs of crystal amplifiers 30 are fed through isolating resistors 31 through a differentiating network comprising capacitor 102 and resistor 103, to amplifier 100. A true differentiator is not practical however, being extremely susceptible to high frequency noise since AC gain increases at the rate of 6 db per octave. A partial differentiator is completely adequate in this invention for determining the slopes of the curves. The output of amplifier 100 is shown in FIG. 7C, the height of curve 124 being proportional to slope 114' in FIG. 7A, and the height of curves 125 and 126 being proportional to the slopes of curve 115' and 116'. The output of amplifier 100 is fed to inverting amplifier 101, whose output is shown in curves 124', 125' and 126'. The gain of amplifier 101 is adjusted by feedback potentiometer 107–108 so that curve 125', produced by striking a sound shell, peaks slightly higher than curve 124, and curve 126', produced by taping a cracked shell falls below 124.

The output of amplifier 100 is fed through diode 127 to charge capacitor 110 with diode 127 and capacitor 110 forms one side of a peak reader. The voltage across capacitor 110 is fed to the negative input of amplifier 32 and is depicted in curve 134, FIG. 7D. The long decay time is established by the time constant of capacitor 110 and resistor 109. In the same fashion the output of amplifier 101 is fed through diode 128 forming the other side of the peak reader with capacitor 111, to the positive input of amplifier 32, charging capacitor 111 and producing curve 135 in FIG. 7D for a good egg and curve 136 for a cracked egg.

Amplifier 32, diode 42, resistor 44, and capacitor 43 comprise the same amplifier and integrator circuit described in connection with FIG. 2.

Figures 7D, 7E:
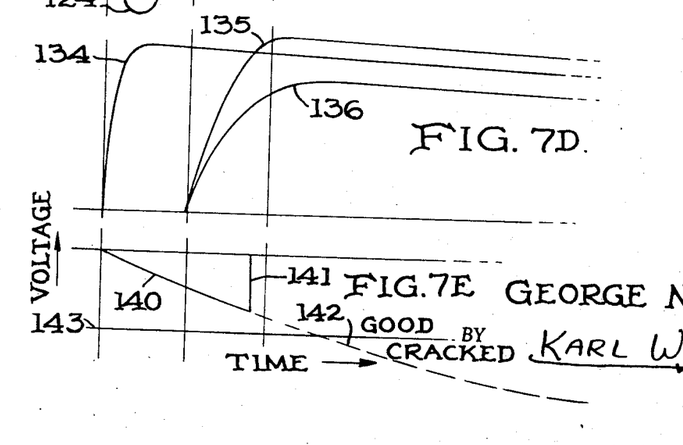

Referring to FIG. 7E, the moment the egg is tapped the voltage is impressed on the negative input of amplifier 32 driving it into the negative state and causing capacitor 43 to start charging along line 140. If the shell is sound the voltage level of curve 135 will exceed the voltage level of curve 134. At the time the curves cross, amplifier 32 changes to the positive state discharging capacitor 43 along line 141. In the event the shell is cracked the voltage of curve 136 does not reach the voltage level of curve 134 and capacitor 43 continues to charge along line 142. As curve 142 crosses line 143, amplifier 33 reads out a crack as previously described.

A much finer degree of discrimination between sound shells and shells with small cracks may be obtained in this fashion than by merely observing the width of the pulse.

By properly tailoring the time constants of capacitor 110, and resistor 109, and capacitor 111 and resistor 112, only the first pulse in each string may be read out.

It should be understood that the vibration sensitive elements need not be piezoelectric crystals. Many other devices would serve equally well such as magnetic elements, capacitive elements or vibration sensitive transistors. In fact, the read out need not be electrical; for with the fluidic elements presently available, the functions just described could be performed fluidicly.

Also there are electronic configurations using tubes, transistors, or integrated circuits, capable of performing the described functions without departing from the scope of the invention.

It is to be understood that the invention is not limited to the embodiment disclosed which is illustratively offered, and that modifications may be made without departing from the invention.

What is claimed is:

1. A crack detector device comprising
   a vibration transducer means positioned to contact an article under test on at least one point on its surface, said vibration transducer means including
   a contacting element to impart energy to the article under test by contacting it during relative motion of the article and said vibration transducer means and to receive energy returned from the article,
   and means responsive to said vibration transducer means to detect and measure the returned energy in comparison with the amount of energy imparted to the article.

2. The crack detector device of claim 1, further characterized by
   said means to detect and measure the returned energy including
   means to compare the ascending slope of a curve depicting energy to the article and the descending slope of said curve depicting energy returned from the article
   whereby a cracked article produces a lesser slope than a sound article and a sound article produces a more symmetrical curve.

3. A crack detector device comprising
   a vibration transducer means positioned to contact an article under test on at least one point on its surface,
   said vibration transducer means including
   a contacting element to impart energy to the article under test by contacting it during relative motion of the article and said vibration transducer means and to receive energy returned from the article,
   and means responsive to said vibration transducer means to detect and measure the returned energy,
   said means to detect and measure the returned energy having means to detect a pulse and compare the width of said pulse with a predetermined pulse width
   whereby a cracked article produces a wider pulse than a sound article.

4. The crack detector device of claim 1, further characterized by
   said vibration transducer means including a series of said contacting elements to contact the article under test as the article rolls over said contacting elements presenting different portions of its surface to successive elements.

5. The crack detector device of claim 4, further characterized by
protective sheet covering having openings therein for said series of contact points to protrude therethrough.

6. A crack detector device comprising
a vibration transducer means positioned to contact an article under test on at least one point of its surface,
said vibration transducer means including
a series of contacting elements to impart energy to the article under test by contacting it during relative motion of the article and said vibration transducer means and to receive energy returned from the article, contacting the article under test as the article rolls over said contacting elements presenting different portions of its surface to successive elements,
said means to detect and measure the returned energy being pulse width discriminating means to detect a pulse and compare the width of said pulse with a predetermined pulse width
whereby a cracked article produces a wider pulse than a sound article,
said pulse width discriminating means being responsive only to the first pulse of a pulse train produced from each of the successive contacts.

7. A crack detector device comprising
a vibration transducer means positioned to contact an article under test on at least one point on its surface,
said vibration transducer means including
a series of contacting elements to impart energy to the article under test by contacting it during relative motion of the article and said vibration transducer means and to receive energy returned from the article, contacting the article under test as the article rolls over said contacting elements presenting different portions of its surface to successive elements,
each of said series of contacting elements operatively attached to a piezoelectric crystal,
amplifying means connected to said piezoelectric crystals,
clipping means connected to said amplifying means,
pulse width discriminator means connected to said clipping means.

8. The crack detector device of claim 7 further characterized by
means to reject cracked articles after they have rolled over said series of contact points including continuous tape wound on means for moving said tape,
read-in means connected to said pulse width discriminator means,
gating means for rejecting cracked articles,
read-out means connected to said gating means spaced from said read-in means a predetermined distance in relation to the timed movement of said tape to coincide the reading of said read-out means with the arrival of the article at said gating means.

9. The crack detector device of claim 4, further characterized by
each of said series of contact points operatively attached to a piezoelectric crystal having an output therefrom,
differentiating network means connected to said crystal outputs to determine the slopes of curves depicting energy imparted to the articles and energy returned from the articles,
inverting amplifier means connected to said differentiating network means,
peak reader means connected to said inverting amplifier means and said differentiating network means,
comparator means connected to each of said peak reader means, and
integrating circuit means connected to said comparator means.

10. A method of detecting cracks in an article comprising the steps of
moving the article and at least one vibration transducer relative to each other,
contacting the article on at least one portion of its surface with said at least one vibration transducer thus imparting energy to the surface of the article at its point of contact,
receiving similar form of energy from the article during its period of contact at said point of contact with the vibration transducers,
and comparing the amount of energy returned from the article with the amount of energy imparted to the article.

11. The method of detecting cracks in an article comprising the steps of
moving the article and at least one vibration transducer relative to each other,
contacting the article on at least one portion of its surface with at least one vibration transducer thus imparting energy to the surface of the article at its point of contact,
receiving similar form of energy from the article during its period of contact at said point of contact with the vibration transducers,
said step of receiving including detecting the imparted and returned energy received in the form of a pulse,
and the step of comparing the width of said pulse with that of a pulse of predetermined width
whereby a cracked article produces a wider pulse than a sound article.

12. The method of detecting cracks of claim 10, further comprising
said step of receiving including detecting the energy imparted to the article and the energy received from the article in the form of a curve having ascending and descending slopes,
and said step of comparing the amount of energy involving comparison of ascending and descending slopes
whereby a cracked article produces a lesser slope than a sound article and further departs from a symmetry of ascending and descending slopes.

13. A method of detecting cracks in an article comprising the steps of
moving the article and at least one vibration transducer relative to each other,
contacting the article on its surface with at least one vibration transducer thus imparting energy to the article at its point of contact, receiving a similar form of energy from the article during its contact at said point of contact with said at least one transducer, said step of receiving including detecting the energy imparted to the article and the energy received from the article in the form of a voltage versus time curve having ascending and descending slopes, and comparing the ascending and descending slopes whereby a cracked article produces a lesser slope than a sound article and further departs from a substantial symmetry of ascending and descending slopes detected with a sound article.

* * * * *